(12) United States Patent
Richardson

(10) Patent No.: US 6,246,729 B1
(45) Date of Patent: Jun. 12, 2001

(54) METHOD AND APPARATUS FOR DECODING A PHASE ENCODED DATA SIGNAL

(75) Inventor: David Livingstone Richardson, Arlington Heights, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/149,340

(22) Filed: Sep. 8, 1998

(51) Int. Cl.[7] ............... H03D 3/00; H04L 27/22
(52) U.S. Cl. ............ 375/324; 375/340; 329/345
(58) Field of Search .................. 375/340, 324, 375/271, 279, 283, 329, 330, 331; 329/304, 345; 455/42, 205

(56) References Cited

U.S. PATENT DOCUMENTS

| | | | |
|---|---|---|---|
| 3,758,870 | 9/1973 | Schmitt et al. | 329/104 |
| 3,808,367 | 4/1974 | Wigner et al. | 178/69.5 R |
| 3,930,203 | 12/1975 | Haass | 328/155 |
| 4,092,491 | 5/1978 | Frazer | 178/67 |
| 4,290,140 | 9/1981 | Malm | 375/46 |
| 4,302,845 | 11/1981 | McClaughry et al. | 375/82 |
| 4,503,472 | 3/1985 | Lacher | 360/43 |
| 5,367,539 | 11/1994 | Copley | 375/100 |
| 5,373,536 | 12/1994 | Dehner, Jr et al. | 375/106 |
| 5,408,499 | 4/1995 | Sasaki | 375/286 |
| 5,414,730 | 5/1995 | Lundquist et al. | 375/208 |
| 5,488,632 | 1/1996 | Mason et al. | 375/260 |
| 5,610,949 | 3/1997 | Petranovich | 375/330 |
| 5,625,652 | 4/1997 | Petranovich | 375/355 |
| 5,764,102 | * 6/1998 | Cochran et al. | 329/304 |
| 6,044,106 | * 3/2000 | Suzuki | 375/324 |

* cited by examiner

Primary Examiner—Stephen Chin
Assistant Examiner—Betsy L. Deppe
(74) Attorney, Agent, or Firm—Terry J. Anderson; Karl J. Hoch, Jr.

(57) ABSTRACT

A method and apparatus for decoding a phase encoded data signal utilizes windowed data which is transformed into real and imaginary frequency components thereof. The real and imaginary frequency components are converted into phase and magnitude information. The magnitude information is used to calculate a threshold based upon a signal-to-noise ratio, and the phase of the data signal is corrected by identifying and sorting magnitude peaks. The data signal is differentially demodulated and the demodulated data is then multiplied by a correlation sequence so as to facilitate its being converted into a binary number.

38 Claims, 7 Drawing Sheets

METHOD AND APPARATUS FOR DECODING A PHASE ENCODED DATA SIGNAL

FIELD OF THE INVENTION

The present invention relates generally to data communications and more particularly to a method and apparatus for decoding a phase encoded data signal wherein a windowed data signal is transformed into real and imaginary frequency components. The real and imaginary frequency components are converted to phase and magnitude information. The magnitude information is used to calculate a threshold based upon a signal-to-noise ratio, and the phase of the data signal is corrected by identifying and sorting magnitude peaks. The data signal is differentially demodulated and the demodulated data signal is then multiplied by a correlation sequence so as to facilitate its being converted into a binary number.

BACKGROUND OF THE INVENTION

The use of phase encoding for modulating a digital data signal is well known. Such phase encoding comprises varying the phase of a digital signal so as to represent one or more data bits with each phase transition.

For example, if four different phases, e.g., 0°, 90°, 180°, and 270°, are used, then causing the phase to recede, to be reduced from 0° to 270°, reduced from 90° to 0°, reduced from 180° to 90°, or reduced from 270° to 180°, may be utilized to represent a the binary number 0; and similarly, advancing the phase, i.e., from 0° to 90°, 90° to 180°, 180° to 270°, 270° to 0°, may be utilized to represent the binary number 1.

The use of such phase encoding has the potential to offer a degree of noise immunity while facilitating comparatively high data rates.

However, such phase encoding is susceptible to noise interference when very high data rates are utilized, especially when the level of the transmitted signal is very low, such as when spread spectrum techniques are utilized.

In view of the foregoing, it would be beneficial to provide means for decoding phase encoded digital data communications which provides for a high degree of reliability, particularly when high data rates are utilized with low power signals, such as those common in spread spectrum communications, particularly in electrically noisy environments.

SUMMARY OF THE INVENTION

The present invention specifically addresses and alleviates the above-mentioned deficiencies associated with the prior art. More particularly, the present invention comprises a method and apparatus for decoding a phase encoded data signal.

The method for decoding a phase encoded data signal comprises windowing the data signal in order to reduce side lobes in a frequency spectrum of the data signal, so as to mitigate interference with other signals; transforming the windowed data signal into real and imaginary frequency components thereof; converting the real and imaginary frequency components of the data signal into phase and magnitude information with respect thereto; and summing a plurality of frequencies which substantially comprise noise to provide a magnitude of a noise floor. The magnitude of the data signal is compared to the magnitude of the noise floor so as to form a signal-to-noise ratio. The signal-to-noise ratio is compared to a threshold value and further processing of the signal is facilitated when the signal-to-noise ratio exceeds the threshold value. A maximum magnitude of the data signal is identified and a phase correction is calculated and added to the data signal. The data signal is then differentially demodulated and the demodulated data signal is multiplied with a correlation sequence to form a product signal. The product signal is then hard-limited and converted to a binary number, thus completing the demodulation or decoding process.

The step of windowing the data signal comprises multiplying the data signal by a window function. According to the preferred embodiment of the present invention, the step of windowing the data signal comprises using a 4 sample Blackman-Harris window, a Hamming window, or a Blackman window.

According to the preferred embodiment of the present invention, the step of transforming the windowed data signal comprises performing a Fast Fourier Transform (FFT) upon the windowed data signal, preferably so as to transform the windowed data signal into approximately 16,384 real frequency components and approximately 16,384 imaginary frequency components.

According to the preferred embodiment of the present invention, the step of converting the real and imaginary frequency components of the data signal into phase and magnitude information with respect thereto comprises performing a polar to rectangular conversion upon only those frequencies which are required for decoding the data signal.

According to the preferred embodiment of the present invention, the step of summing a plurality of frequencies which substantially comprise noise comprises summing approximately 500 frequencies above a frequency of the data signal and approximately 500 frequencies below the frequency of the data signal.

According to the preferred embodiment of the present invention, the step of comparing the signal-to-noise ratio to a threshold value comprises comparing the signal-to-noise ratio to a threshold value of between approximately 6 dB and approximately 50 dB, preferably approximately 6 dB.

The step of identifying a maximum magnitude of the data signal preferably comprises reading frequency components and calculating a slope of the magnitudes and defining a center frequency of the data signal.

The frequency components are preferably read from left to right so as to calculate a slope of the magnitudes. A center frequency of the data signal is then defined as the frequency immediately to the left of the first frequency which results in a calculation of a negative slope.

According to the preferred embodiment of the present invention, those peaks which cannot be processed real time by the phase correction circuit are discarded and phase correction is thus not performed thereon.

The step of adding the phase correction to the data signal preferably comprises modifying a phase of a data signal when a peak of the data signal is not in the center of a transform bin.

According to the preferred embodiment of the present invention, the step of adding the phase correction to the data signal comprises modifying a phase of the data signal when a peak of the data signal is not in the center of a Fourier Transform bin by determining a peak magnitude of the data signal and a next-magnitude of the data signal and then forming a ratio thereof. Next, the ratio is multiplied by 90° and an even/odd phase range is added thereto. The even/odd phase range is defined such that an even numbered Fourier Transform bin is −270° at the left edge, 0° in the middle, and +270° on the right edge and such that an odd numbered Fourier Transform bin is +270° on the left edge, −180°/+180° in the middle, and −270° on the right edge, with the amount of correction being linear between the boundary edges.

The step of differentially demodulating the data signal comprises subtracting a phase of a current data signal from a phase of a previous data signal and providing a linearly scaled number between −1 and +1, where −1 is a phase of −90° is 0°, 180°, and −180°, and +1 is a phase of +90°. The transfer function that is used to convert phase to a linearly scaled number is shown in FIG. 6.

The step of multiplying the demodulated data signal with a correlation sequence preferably comprises multiplying the demodulated data signal with a 13-bit Willard sequence of 1111100101000 which is modified by replacing the 0's with negative 1's to provide a number between −13 and +13, where +13 is the maximum correlation value, and also comparing the number to a threshold equal to +10 and when the number exceeds the threshold, then a correlation detection is found. The correlation detection defines the start of a message. The message is preferably formatted into a block size of 127 bits, of which 16 bits are synchronization bits and 111 bits are data bits. The 16 synchronization bits preferably comprise 13 Willard bits, a start bit, and 2 spare bits.

The apparatus of the present invention comprises a window circuit for reducing side lobes in a frequency spectrum of the data signal so as to mitigate interference with other signals, a transform circuit for transforming the windowed data signal into real and imaginary frequency components thereof, a rectangular-to-polar conversation circuit for converting the real and imaginary components of the data signal into phase and magnitude information with respect thereto, a noise floor circuit for summing a plurality of frequencies which substantially comprise noise to provide a magnitude of a noise floor, a signal-to-noise ratio circuit for comparing the magnitude of the data signal to the magnitude of the noise floor so as to provide a signal-to-noise ratio, a threshold detector circuit for comparing the signal-to-noise ratio to a threshold value and for facilitating further processing of the signal when the signal-to-noise ratio exceeds the threshold value, a find peak circuit for identifying a maximum magnitude of the data signal, a phase correction circuit for calculating a phase correction and for adding the phase correction to the data signal, a differential phase decoder for differentially demodulating the data signal, a correlator for multiplying the demodulated data signal with a correlation sequence, and a binary converter for hard limiting the output of the differential phase decoder and for converting the output of the differential phase decoder into a binary number.

The window circuit preferably comprises a circuit for multiplying the data signal by a window function, preferably a 4 sample Blackman-Harris window function, a Hamming window function, or a Blackman window function.

The Transform circuit preferably comprises a Fast Fourier Transform (FFT) circuit. Those skilled in the art will appreciate that other transforms, such as the Laplace Transform, are likewise suitable.

The Fourier Transform Circuit preferably comprises a circuit for transforming the windowed data signal into approximately 16,384 real frequency components and approximately 16,384 imaginary frequency components.

The rectangular-to-polar conversion circuit preferably comprises a circuit for converting only those frequencies which are required for decoding the data signal.

The noise floor circuit preferably comprises a circuit for summing approximately 500 frequencies above the frequency of the data signal and approximately 500 frequencies below the frequency of the data signal.

The threshold detector circuit preferably comprises a circuit having a threshold value of between approximately 6 dB and approximately 50 dB, preferably approximately 6 dB.

The find peak circuit preferably comprises a circuit for reading frequency components from the Transform circuit and for calculating a slope of the magnitudes and defining a center frequency of the data signal.

The find peak circuit preferably comprises a circuit for reading frequency components from left to right to calculate a slope of the magnitudes. A center frequency of the data signal is defined as the frequency immediately to the left of the first frequency which results in a calculation of a negative slope.

The phase decoder of the present invention preferably further comprise a sort peak circuit for receiving peaks from the find peak circuit and for sending only those peaks which can be processed real time by the phase correction circuit thereto.

The phase correction circuit preferably comprises a circuit for modifying a phase of a data signal when a peak of the data signal is not in the center of a Fourier Transform bin by determining a peak magnitude of the data signal and a next-highest magnitude of the data signal and forming a ratio thereof, then multiplying the ratio by 90∨ and then adding an even/odd phase range thereto. The even/odd phase range is defined such that an even-numbered Fourier Transform bin is −270° at the left edge, 0° in the middle, and +270° on the right edge and such that the odd-numbered Fourier Transform bin is +270° at the left edge, −180°/+180° in the middle, and −270° on the right edge, with the amount of correction being linear between the boundary edges.

The differential phase decoder preferably comprises a circuit for subtracting a phase of a current data signal from a phase of a previous data signal and for providing a linearly scaled number between −1 and +1, where −1 is a phase of −90°, 0 is 0°, 180°, or −180°, and +1 is a phase of +90°. The transfer function that is used to convert phase to a linearly scaled number is shown in FIG. 6.

According to the preferred embodiment of the present invention, the correlator comprises a circuit for multiplying the demodulated data signal with a 13-bit Willard sequence of 1111100101000 which is modified by replacing the 0's with negative 1's to provide a number between −13 and +13, where +13 is the maximum correlation value. The circuit also compares the number to a threshold equal to +10 and when the number exceeds the threshold, then a correction detection is found. The correction detection defines the start of a message. The message is then preferably formatted into a block size of approximately 127 bits, of which 16 bits are preferably synchronization bits and 111 bits are preferably data bits. The 16 synchronization bits preferably comprise 13 Willard bits, a start bit, and 2 spare bits.

Thus, according to the present invention, a method and apparatus are provided for decoding a phase-encoded data signal which reliably decodes low-level signals having high data rates in noisy environments.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and the sequence of steps for constructing and operating the invention in connection with the illustrated embodiment. It is to be understood, however, that the same or equivalent functions may be accomplished by different embodiments that are also intended to be encompassed within the spirit and the scope of the invention.

The present invention comprises a method for encoding and decoding a radio frequency signal utilizing phase modulation for applications in digital data communications. Such applications include Mayday communications between an automobile and an emergency service provider, for example. The communications methodology of the present invention utilizes phase modulation of the signal, and a means for detecting and decoding the phase modulated signal. Phase demodulation utilizes digital signal processing so as to facilitate high data rates while utilizing a low-level signal in a noisy environment, such as in spread spectrum techniques.

The signal reception is asynchronous, operates in real time, and supports multiple access capability. This means that a receiver can detect and decode messages which have been sent simultaneously from several transmitters. The multiple access methodology of the present invention is random and uses frequency and time division multiplexing. Encoder and Transmitter The input message to the phase encoder of the present invention is a time sequence of binary data. The data format is discussed in detail below with respect to phase decoding. According to the present invention, the time sequence of binary data is differentially encoded with ±P° via a phase modulator, wherein 0 means the signal is modulated with receding phase P and a 1 means that the signal is modulated with advancing phase P. That is, when it is desired to transmit a 0, the phase of the transmitted signal is receded or reduced. For example, if the presently transmitted phase is 0°, then the new phase is 270°, if the phase presently being transmitted is 270°, then the new phase is 180°, if the phase presently being transmitted is 180°, then the new phase is 90°, and if the phase currently being transmitted is 90°, then the new phase is 0°.

Similarly, if it is desired to transmit a binary 1, then if the phase presently being transmitted is 0°, then it is changed to 90°, if the phase presently being transmitted is 90°, then it is changed to 180°, if the phase presently being transmitted is 180°, then it is changed to 270°, and if the phase presently being transmitted is 270°, then it is changed to 0°.

Figure 1:
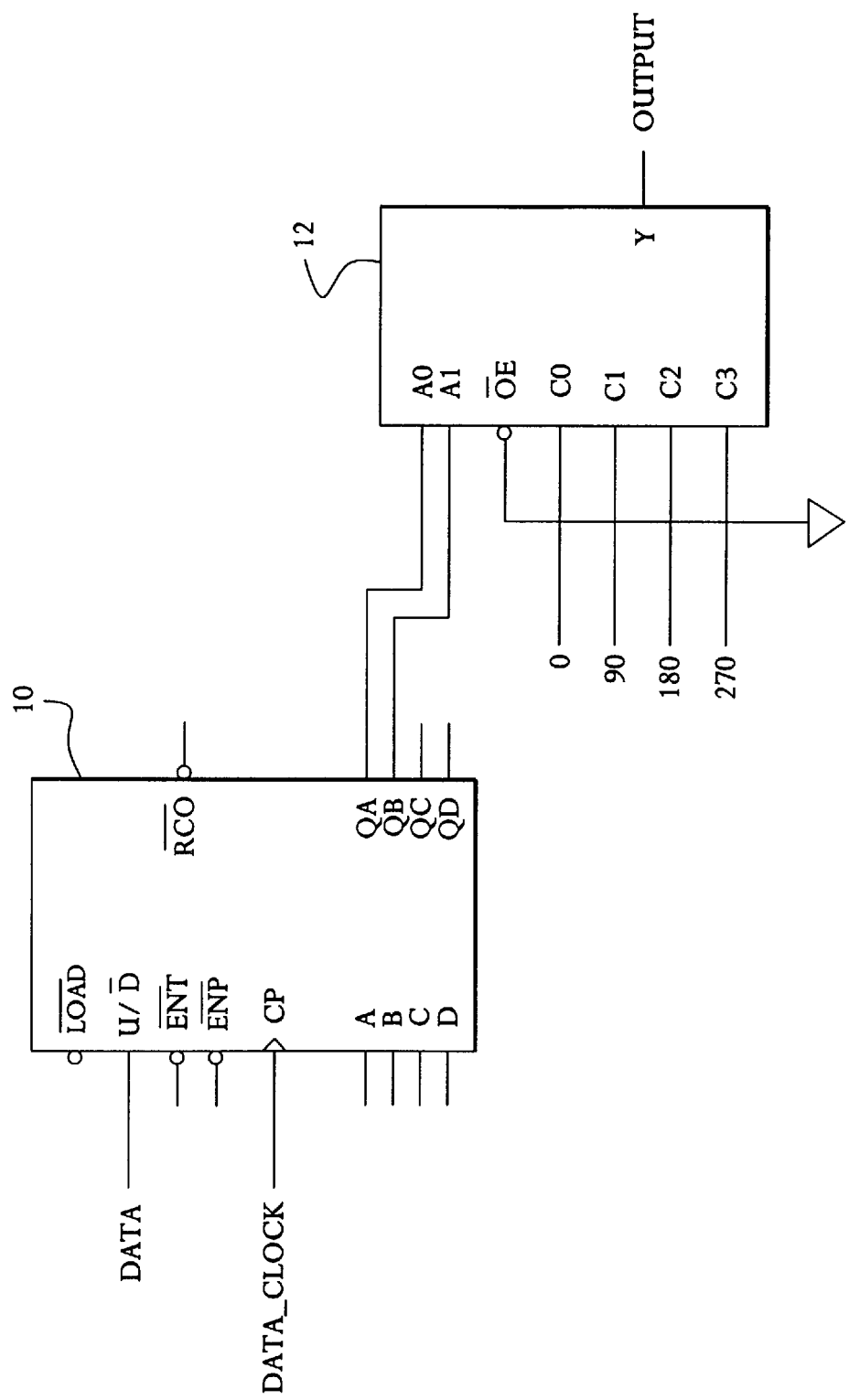
FIG. 1 is a block diagram showing the phase modulator and differential encoder of the present invention.

Referring now to FIG. 1, a circuit for phase encoding a time sequence of binary data utilizing 90° phase shifts, as discussed above, is shown. The circuit comprises a digital up/down counter 10 and a multiplexer 12. Binary data is applied to the up/down line. Differential encoding is performed by the up/down counter 10, where a count-up is effected by a data bit 1 and a count-down is effected by a data bit 0.

The output of the digital up/down counter 10 is applied to the control lines of the 4:1 digital multiplexer 12. According to the preferred embodiment of the present invention, the input to the multiplexer 12 comprises a series of pulses at a comparatively high frequency (so as to facilitate the desired high data rate), wherein the pulses have the desired phase changes with respect to one another. According to the preferred embodiment of the invention, four phases are provided because 90° phase shifting is employed (360÷P= 360/90=4). However, those skilled in the art will appreciate that various other phase shifts are likewise suitable and may be implemented, as desired.

It is important to note that this is a serial modulation method and thus provides the potential for unlimited message length. An exemplary output for a simple 8-bit message is provided below:

| Input sequence | Output phase (degrees) |
| --- | --- |
| 0 0 0 1 1 0 1 1 | −90 −180 +90 +180 −90 −180 −90 0 |

Figure 2:
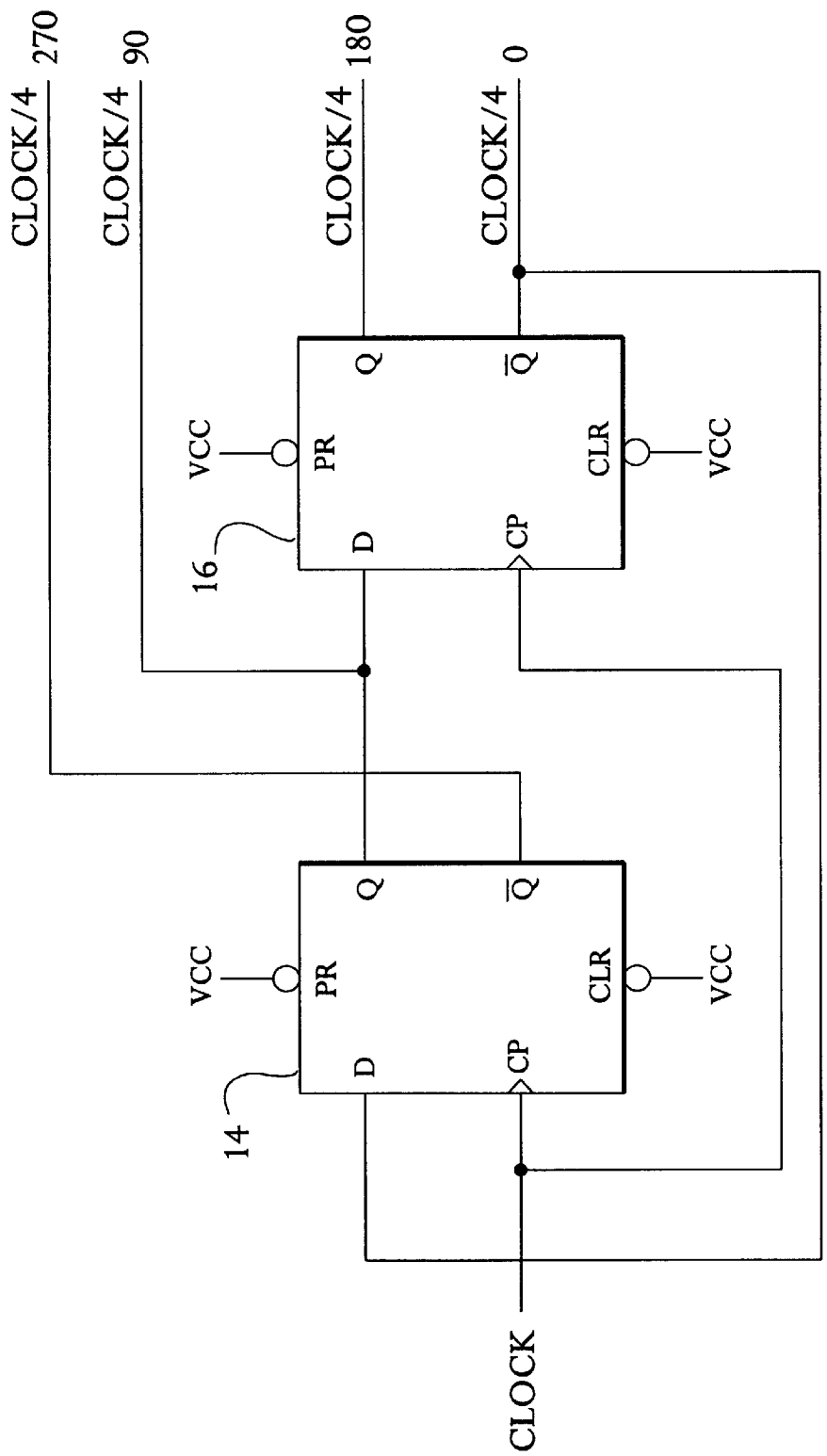
FIG. 2 shows a 90° phase generator according to the present invention.

Referring now to FIG. 2, a phase generator for P=90° is shown. The phase generator divides a CLOCK signal utilizing two D-type flip-flops 14, 16. The outputs of the phase generator are 0°, 90°, 180°, and 270°. The four outputs may be written equivalently as 0°, 90°, −180°, and −90, because 180° is the same as −180° during steady-state conditions and 270° is the same as −90° during steady-state conditions. Each output of the phase generator has a frequency equal to ¼ of the input CLOCK frequency to D-type flip-flop 14. The frequency of the CLOCK signal input to flip-flop 14 is chosen so as to be much greater than the frequency of the DATA_CLOCK of FIG. 1. For example, according to the preferred embodiment of the present invention, the CLOCK signal has a frequency of approximately 27.12 MHz and the DATA_CLOCK signal has a frequency of approximately 4 Hz. The carrier frequency, i.e., the frequency of the four outputs of the phase generator of FIG. 2, is thus 27.12 divided by 4 which is equal to 6.78 MHz.

As those skilled in the art will appreciate, a phase generator can be constructed for any arbitrary phase P in the range of 0<P<360, simply by using additional dividers. The decoding process, described in detail below, will work with any arbitrary phase P.

Figure 3:
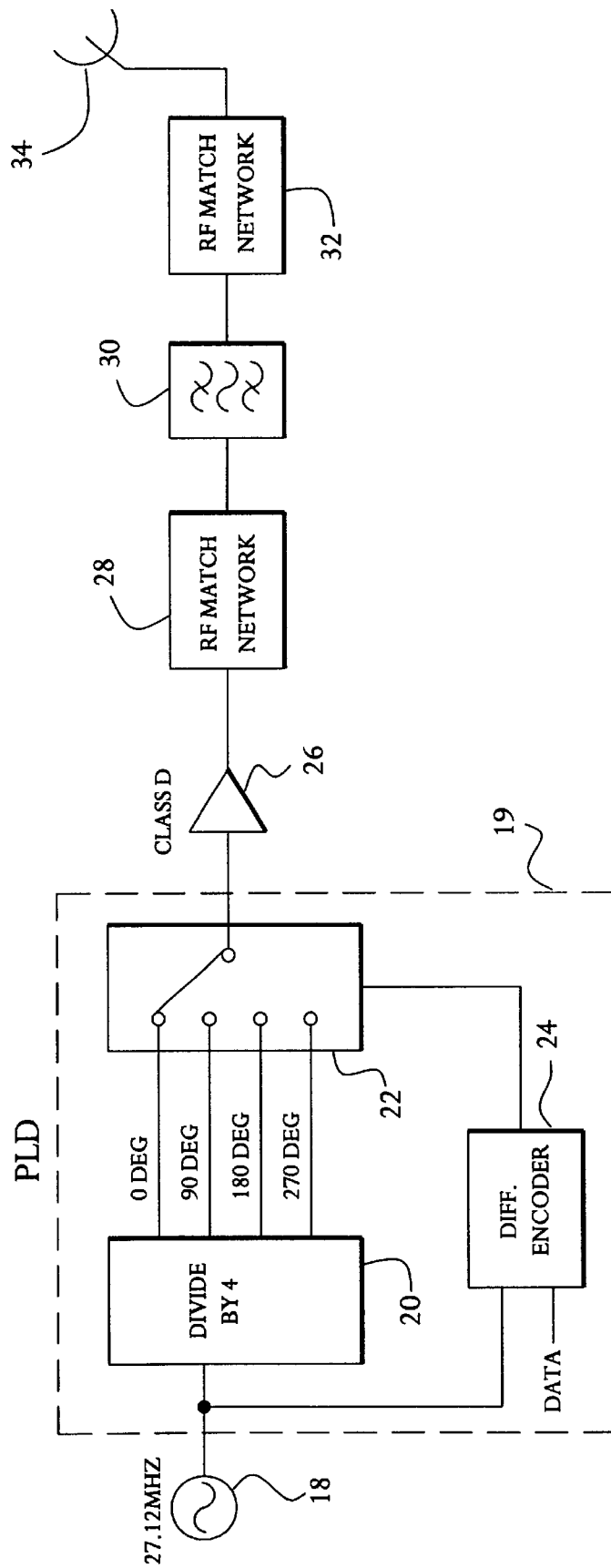
FIG. 3 shows a block diagram of a radio transmitter according to the present invention.

Referring now to FIG. 3, the high frequency (HF) radio system for amplifying and transmitting the phase encoded signal to an antenna is shown. A differential encoder 24 and phase modulator, comprising divide by four 20 and multiplexer 22, are defined by a digital programmable logic device (PLD) 19. A radio frequency oscillator 18, preferably having an output of approximately 27.12 MHz provides an input to the digital Programmable Logic Device PLD 19. The output from the PLD 19 is amplified, preferably via a 50-ohm Class D power amplifier 26. The output of the Class D power amplifier 26 is preferably matched to provide a 50-ohm impedance via RF match network 28. A 50-ohm bandpass filter (BPF) 30 attenuates undesirable harmonics from the Class D amplifier 26. The filter is matched to the antenna 34 via RF matching network 32. According to the preferred embodiment of the present invention, the transmitted carrier frequency is approximately 6.78 MHz.

Figure 4:
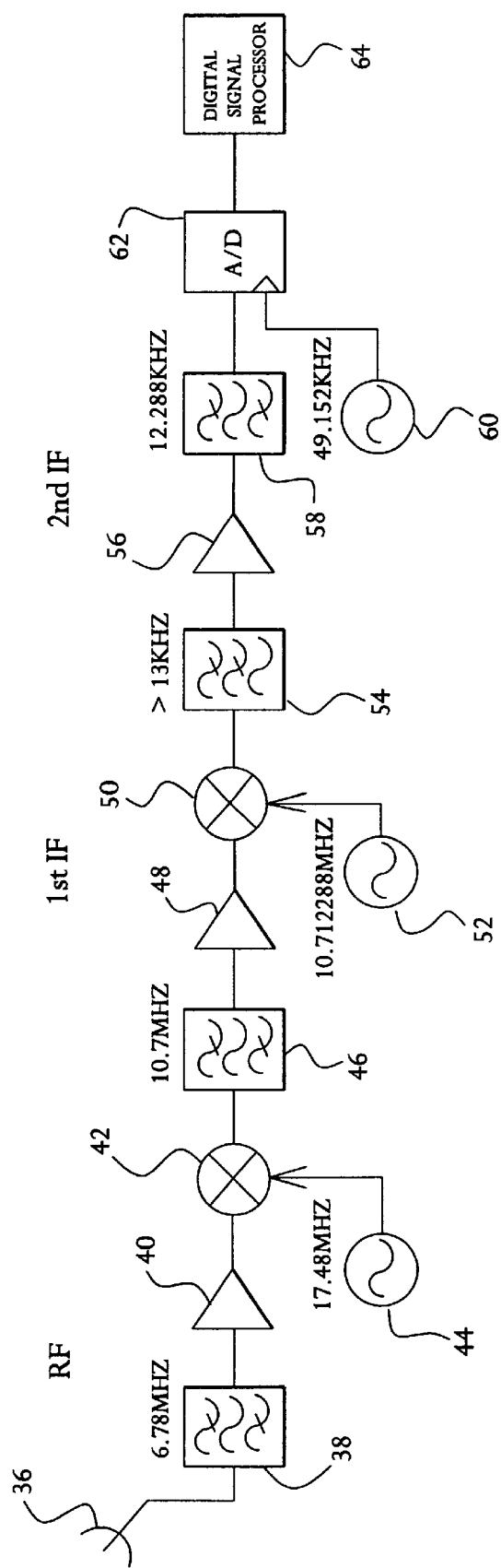
FIG. 4 shows a block diagram of a radio receiver according to the present invention.

Referring now to FIG. 4, the radio frequency (RF) section of a receiver for receiving the signal broadcast by the transmitter of FIG. 3 is shown. The receiver obtains the transmitted RF signal from the antenna 36, filters it via bandpass filter 38 to mitigate undesirable images and spurious signals, amplifies the radio frequency signal via low-noise amplifier 40, and mixes the radio frequency signal via mixer 42 with the first local oscillator 44, that preferably provides a local oscillator output at 17.48 MHz, so that the mixer 42 provides an output at the first intermediate frequency (IF) of 10.7 MHz. First IF filter 46 filters the intermediate frequency signal, preferably with a narrow band 10.7 MHz crystal filter so as to define the band width of the RF receiver. This band-limited intermediate frequency signal is then amplified via amplifier 48 and then converted to a second intermediate frequency (IF) via mixer 50 and second local oscillator 52 which is preferably tuned to 10.712288 MHz so as to provide a second intermediate frequency of 12.288 KHz.

The second intermediate frequency is then filtered via low-pass filter 54, which preferably provides low-pass filtering at approximately 13 KHz. The output of the low-pass filter 54 is then amplified via amplifier 56 and then band-passed at 12.288 KHz via bandpass filter 58.

Analog-to-digital converter 62 uses a CLOCK, preferably having a frequency of approximately 49.152 KHz to perform analog-to-digital conversion upon the second intermediate frequency input thereto. The digital output of analog-to-digital converter 62 is then provided to digital signal processor 64, which is shown in FIG. 5 and discussed in detail below.

Figure 5:
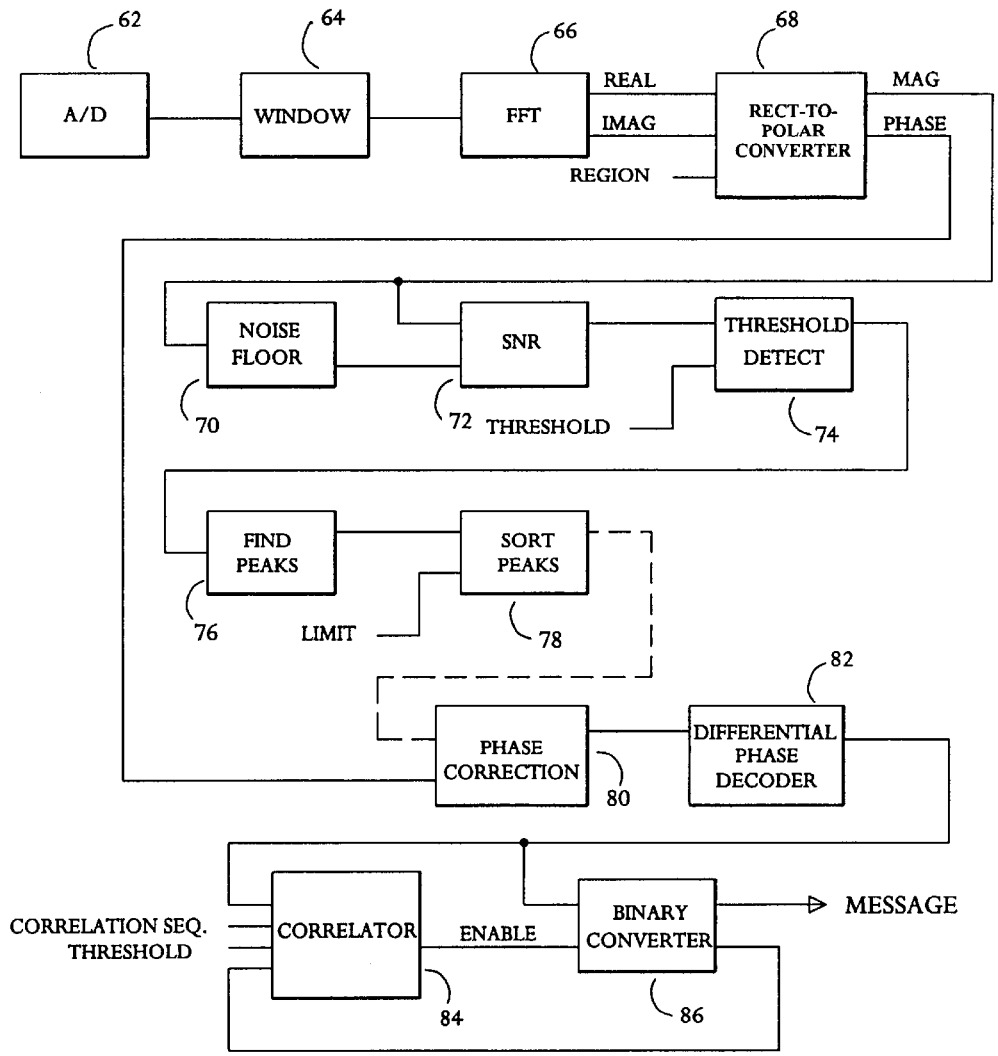
FIG. 5 shows a flow chart illustrating digital signal processing of a radio transmission so as to effect phase decoding thereof according to the present invention.

Referring now to FIG. 5, the elements of the digital signal processor of FIG. 4 comprise a window circuit 64 which multiplies the digital data input thereto from analog-to-digital converter 62 by a window function so as to mitigate the amplitude of sidelobes in the frequency spectrum thereof and also to mitigate interaction from nearby, non-data signals. According to the preferred embodiment of the present invention, the window circuit 64 comprises a circuit for performing 4 sample Blackman-Harris windowing, which is capable of reducing the sidelobes by approximately −92 dB. Alternatively, other windowing circuits such as a Hamming window or a Blackman window may alternatively be utilized.

A transform circuit, preferably a Fast Fourier Transform (FFT) circuit 66, separates the windowed data signal into N different frequency components. According to the preferred embodiment of the present invention, a value of N=16,384 if utilized. However, those skilled in the art will appreciate that the data signal may be divided into various other numbers of frequency components. The output of the FFT circuit 66 is a plurality or array of real and imaginary numbers wherein indices of the array correspond to the frequency of the frequency bins into which the frequencies fall.

Those skilled in the art will appreciate that various other types of transforms, such as Laplace Transforms, may likewise be suitable for separating the window data signal into real and imaginary frequency components thereof.

Rectangular-to-polar converter 68 performs a rectangular-to-polar conversion on the data, converting it to phase and magnitude information. This conversion is preferably limited only to those frequencies which are necessary in the decoding of the data signal, thereby enhancing the speed of the phase decoder.

The noise floor circuit 70 utilizes a plurality of magnitudes from the polar-to-rectangular converter 68, at frequencies which are far from the frequency of the data signal such that these frequencies comprise substantially only undesirable noise, and the noise floor circuit 70 sums the magnitudes present at these frequencies. In this manner, a noise floor of the input signal is determined. Preferably, a large number of frequencies is utilized so as to provide a stable and accurate noise measurement. As those skilled in the art will appreciate, a less representative sample comprised of fewer frequencies may tend to be different from the actual noise floor and may tend to fluctuate undesirably.

According to the preferred embodiment of the present invention, the noise floor circuit 70 utilizes approximately 500 frequencies which are above the frequency of the data signal and approximately 500 frequencies which are below the frequency of the data signal, for a total of approximately 1,000 frequencies. The signal-to-noise (SNR) circuit 72 compares the noise floor from noise floor circuit 70 to the magnitude of the signal so as to form a signal-to-noise ratio (SNR). The threshold detect circuit 74 uses the SNR and compares it to a fixed threshold value. If the signal-to-noise ratio exceeds the threshold level, then the signal is passed on for further processing. As those skilled in the art will appreciate, requiring that the signal-to-noise ratio be above a predetermined level insures that such further processing is performed only upon the actual data, and not upon noise.

According to the preferred embodiment of the present invention, the threshold value of the threshold detect circuit 74 is within the range of approximately 6 dB to approximately 50 dB, and is preferably set at approximately 6 dB so as to insure high sensitivity. An even lower threshold may be utilized, although it may provide excessive fault detection, resulting in the undesirable processing of non-data signals.

Using the signal-to-noise ratio and a threshold, as described above, provides means for tracking the variation of noise which is due to thermal changes in the receiver, gain changes in the receiver, and time-changing RF noise conditions.

The find peak circuit 76 identifies the maximum magnitude of the signal. The FFT data is preferably read from left to right, and the slope of the magnitudes calculated therefrom. When the first negative slope is encountered, a peak is defined as the data point just to its left. This process associates the signal with a single FFT frequency. It is necessary to perform this process because the data signal has a finite width end frequency. The data signal must be associated with a single frequency, rather than a band of frequencies so as to facilitate further processing. As those skilled in the art will appreciate, the frequency width is effected by the window function and by the value N of the FFT.

The sort peak circuit 78 sorts the peaks and passes, some or all of them, on for further processing. The selection criteria of the sort peaks circuit 78 is the number of signals which can be processed in real time by the phase correction circuit 80. Thus, the ability of the phase correction 80 to process peaks determines the LIMIT input to the sort peaks circuit 78, thereby determining the number of peaks which are passed on for further processing. The sort peaks circuit 78 communicates to the phase correction circuit 80, the frequency of the detected signal, or the frequencies of multiple signals.

The phase correction circuit 80 calculates a phase correction and adds it to the phase output of the rectangular-to-polar converter 68. The phase correction circuit 80 only operates upon those signals which were passed by the sort peak circuit 78. The phase correction circuit 80 modifies the data signal phase when the data signal frequency is not in the center of its associated FFT bin. This process comprises the steps of taking the peak magnitude of the signal and the next strongest magnitude associated with the signal, and making a ratio therefrom. The procedure takes advantage of the fact that when a single frequency is applied to the FFT and its frequency is exactly centered in the middle of an FFT bin, then the signal's peak magnitude is stronger than the next nearest bin by 3.3428 dB when using the 4 sample Blackman window. By way of contrast, when a frequency is on the edge of the FFT bin, then its peak magnitude is equal to the magnitude of the adjacent frequency.

The formula for phase correction is 90 degrees times the delta in dB units, plus the even/odd phase range. The even/odd phase range is defined such that an even numbered FFT bin is −270° at the last edge, 0° in the middle, and 270° on the right edge. An odd-numbered FFT bin is +270° on the left edge, −180°/+180° (a discontinuity) in the middle, and −270° on the right edge. The amount of correction is linear between the boundary edges in both instances.

Figure 6:
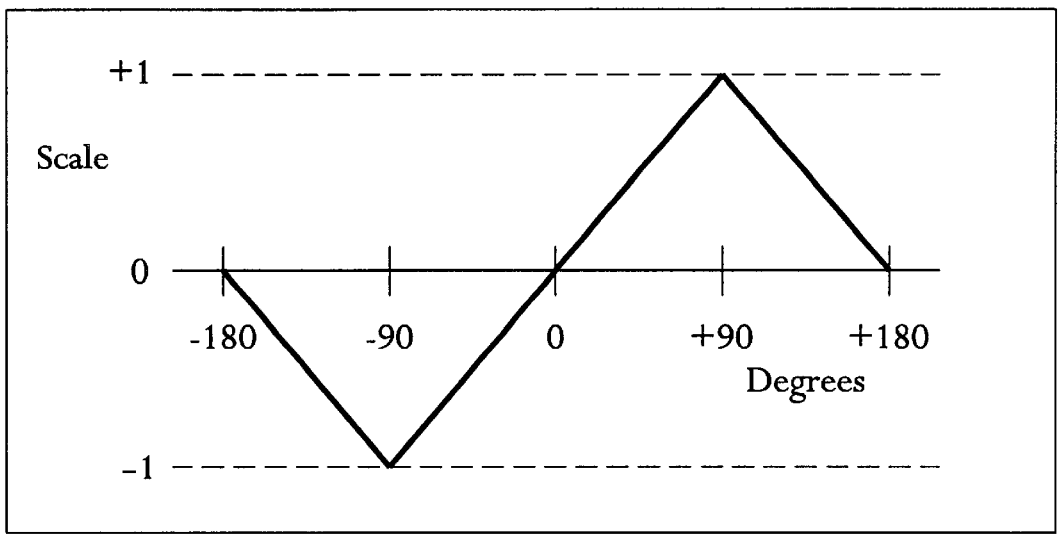
FIG. 6 shows the transfer function that is used to convert phase to a linearly scaled number in the phase decoder of the present invention.

Next, the signal is differentially demodulated in the differential phase decoder 82 by subtracting the phase of the current signal from the phase of the previous signal. The result is a continuous number which is scaled between +1 and −1, where +1 is a phase of +90°, 0.0 is a phase of 0°, 180°, or −180°, and −1 is a phase of −90°. The transfer function that is used to convert phase to a linearly scaled number is shown in FIG. 6.

The correlator 84 takes the number between +1 and −1 and multiplies it with a correlation sequence. The correlation sequence is preferably a 13-bit Willard sequence having a value of 1111100101000. The sequence is modified by replacing the 0's with negative 1's. The multiplication result is a number between −13 and +13, where +13 is the maximum correlation value. The result is compared to a threshold, and when the threshold is exceeded, then a correlation detection is found. The correlation detection defines the start of the message. The correlation threshold is typically +10.

Those skilled in the art will appreciate that various other correlation sequences may be utilized and that various other correlation thresholds are likewise suitable.

The message is preferably formatted into a block size of approximately 127 bits, of which approximately 16 bits are synchronization bits and approximately 111 are pertinent data. The synchronization bits preferably comprise approximately 13 Willard bits, a start bit, and two spare or unused bits. The beginning of the message is the 16 synchronization bits. When a correlation is found, then the remaining portion of the message (or under 111 bits) is decoded. The methodology of the present invention thus supports different message lengths than 111 bits, depending upon the particular applications. The bits, after synchronization, are decoded using the same process as the correlation described in detail above, with the exception that the correlator 84 is latched in the correlation detection on state, and the binary converter 86 is enabled.

The +1 to −1 output from the differential phase decoder 82 is hard limited and converted to a binary number, i.e., 0 or 1, by the binary converter 86. This process continues in the binary converter 86 until the end of the message is reached. The message length is known, so that the end of the message is found by simply counting the number of bits. At the end of the message, the binary converter 86 is turned off, the correlator latch is removed, thereby turning the correlator 84 off, and the process of decoding starts over.

Figure 7:
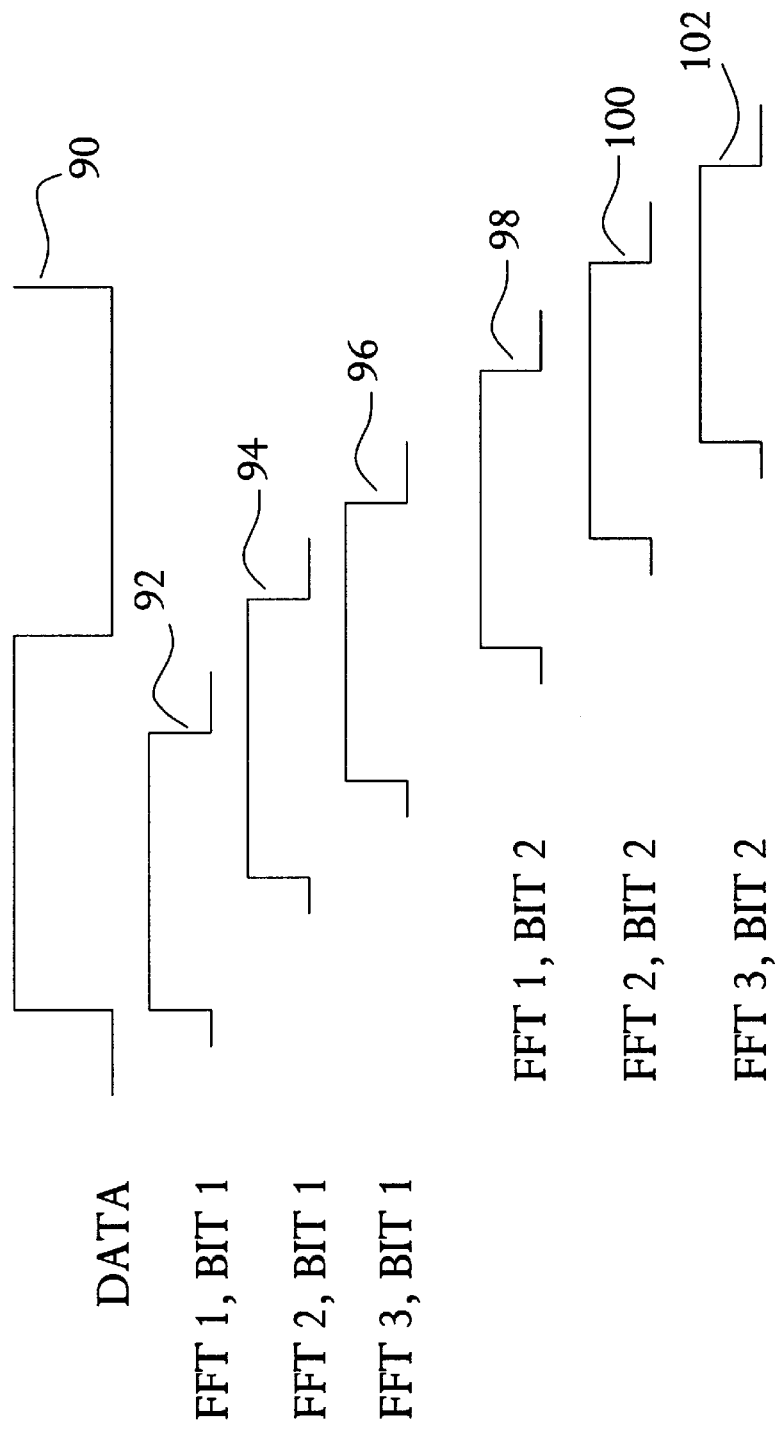
FIG. 7 shows time scan patterns for the phase decoder of the present invention.

Referring now to FIG. 7, the method of synchronizing the timing between the receiver and the transmitter is shown. The input A/D data block is decoded with a set of 3 FFT's and each FFT is offset in time so that, taken together, all 3 FFT's cover the time of one transmitted bit. The digital signal processor (DSP) process from windowing to correlation is preferably performed in each of the three time channels. A marker indicates the time channel that has a successful correlation and the message is decoded in that particular channel. Of course, by utilizing three scans, additional processing time is required for digital signal processing. However, modern DSP components are sufficient fast to accommodate the additional time required.

The data pulse 90 has two bits as shown. FFT 1 for bit 1 92, FFT 2 for bit 1 94, and FFT 3 for bit 1 96, all occur at least partially within the first FFT of the data signal 90. Similarly, FFT 1 of bit 2 98, FFT 2 of bit 2 100, and FFT 3 of bit 2 102 occur within the second bit of the data signal 90.

As those skilled in the art will appreciate, the speed of digital signal processing is determined both by the CPU and the efficiency of the DSP programming codes. Any current data must be processed by the DSP before the next data bit and the message is received. Real time operation is possible utilizing a fast CPU and efficient code. A data rate of up to 10 Hz is possible with a Pentium-class EPC and 32-bit C code. Faster times are possible with a dedicated DSP CPU.

Multiple signals are handled by the present invention by random access using frequency and time separation. Random access is defined such that users have a first come, first served approach to the time and frequency channels. According to the preferred embodiment of the present invention, the preferred random access method is Aloha.

Time separation is defined such that the signals are sent at different times and do not overlap one another. The message length is preferably 127 bits/4 BPS, or approximately 32 seconds. Therefore, the chance that a message would overlap another message in a 24-hour period is very small, unless, of course, there are many transmissions within a short period of time.

In the instances in which transmissions do overlap in time, then the signals are handled by frequency separation. Frequency separation requires that the input signal frequencies do not overlap and are separated by the signal processing bandwidth of the receiver. In the DSP, the frequencies must differ by at least two FFT bins. If the input amplitudes differ greatly, then the frequencies must differ by at least 5 FFT bins.

According to the preferred embodiment of the present invention, a real FFT of approximately 16,384 points is used. The noise measurement preferably uses 1,000 bins, so that the DSP can handle (16,384/2)/5 minus 1,000=638 signals. The multiple frequency signals will effect the use of DSP processing time.

For example, if the DSP is idle 95% of the time when it is processing one signal, then it can, of course, accommodate 20 multiple signals without missing any data. In this case, additional processing is needed to handle the stated 638 signals.

This may be accomplished by the following method. The DSP takes a set of signals, processes them, and marks them as done. Then, in the next pass, it ignores the done signals and processes the next set of signals and then continues to loop until all of the signals have been marked "done". This technique allows for a nearly unlimited number of simultaneous signals, although it will take some time until all of the messages are decoded. The marked signals are revisited periodically so as to refresh the message, and also to see if a new message has been transmitted at the frequency of the prior message.

In utilizing this methodology, there is a very small probability that both the frequency and time will overlap between two messages, and thereby resulting in non-decodable interference. However, as those skilled in the art will appreciate, the probability of such non-decodable interference is small and can be reduced further by utilizing additional frequencies.

It is understood that the exemplary phase decoder of the present invention, which is described herein and shown in the drawings, represents only a presently preferred embodiment of the invention. Indeed, various modifications and additions may be made to such embodiment without departing from the spirit and scope of the invention. Thus, modifications and additions may be obvious to those skilled in the art and may be implemented to adapt the present invention for use in a variety of different applications.

What is claimed is:

1. A method for decoding a phase encoded data signal, the method comprising the steps of:
    a) windowing the data signal to reduce sidelobes in a frequency spectrum of the data signal so as to mitigate interference with other signals;
    b) transforming the windowed data signal into real and imaginary frequency components thereof;
    c) converting the real and imaginary frequency components of the data signal into phase and magnitude information with respect thereto;
    d) summing a plurality of frequencies which substantially comprise noise to provide a magnitude of a noise floor;
    e) comparing the magnitude of the data signal to the magnitude of the noise floor so as to provide a signal-to-noise ratio;
    f) comparing the signal-to-noise ratio to a threshold value and facilitating further processing of the signal when the signal-to-noise ratio exceeds the threshold value;
    g) identifying a maximum magnitude of the data signal;
    h) calculating a phase correction and adding the phase correction to the data signal;
    i) differentially demodulating the data signal;
    j) multiplying the demodulated data signal with a correlation sequence to form a product signal; and
    k) hard limiting the product signal and converting the product signal to a binary number.

2. The method as recited in claim 1, wherein the step of windowing the data signal comprises multiplying the data signal by a window function.

3. The method as recited in claim 2, wherein the step of transforming the windowed data signal comprises performing a Fast Fourier Transform (FFT) upon the windowed data signal so as to transform the windowed data signal into 16,384 real frequency components and 16,384 imaginary frequency components.

4. The method as recited in claim 1, wherein the step of windowing the data signal comprises windowing the data signal according to a method selected from the group consisting of:
    a) performing a 4 sample Blackman-Harris window;
    b) performing a Hamming window; and
    c) performing a Blackman window.

5. The method as recited in claim 1, wherein the step of transforming the windowed data signal comprises performing a Fast Fourier Transform (FFT) upon the windowed data signal.

6. The method as recited in claim 1, wherein the step of converting the real and imaginary frequency components of the data signal into phase and magnitude information with respect thereto comprises performing a rectangular-to-polar conversion upon only those frequencies which are required for decoding of the data signal.

7. The method as recited in claim 1, wherein the step of summing a plurality of frequencies which substantially comprise noise comprises summing approximately 500 frequencies above a frequency of the data signal and approximately 500 frequencies below the frequency of the data signal.

8. The method as recited in claim 1, wherein the step of comparing the signal-to-noise ratio to a threshold value comprise comparing the signal-to-noise ratio to a threshold value of between approximately 6 dB and approximately 50 dB.

9. The method as recited in claim 1, wherein the step of comparing the signal-to-noise ratio to a threshold value comprises comparing the signal-to-noise ratio to a threshold value of approximately 6 dB.

10. The method as recited in claim 1, wherein the step of identifying a maximum magnitude of the data signal comprises reading frequency components and calculating a slope of the magnitudes and defining a center frequency of the data signal.

11. The method as recited in claim 1, wherein the step of identifying a maximum magnitude of the data signal comprises reading frequency components from left to right to calculate a slope of the magnitudes, a center frequency of the data signal being defined as the frequency immediately to the left of the first frequency which results in a calculation of a negative slope.

12. The method as recited in claim 1, further comprising the step of discarding those peaks which cannot be processed real time by the phase correction circuit, such that phase correction is not performed thereon.

13. The method as recited in claim 1, wherein the step of adding the phase correction to the data signal comprises modifying a phase of a data signal when a peak of the data signal is not in the center of a transform bin.

14. The method as recited in claim 1, wherein the step of adding the phase correction to the data signal comprises modifying a phase of a data signal when a peak of the data signal is not in the center of a Fourier Transform bin by determining a peak magnitude of the data signal and a next highest magnitude of the signal and forming a ratio thereof, then multiplying the ratio by 90 degrees and adding an even/odd phase range thereto.

15. The method as recited in claim 1, wherein the step of adding the phase correction to the data signal comprises modifying a phase of the data signal when a peak of the data signal is not in the center of a Fourier Transform bin by determining a peak magnitude of the data signal and a next highest magnitude of the data signal and forming a ratio thereof, then multiplying the ratio by 90 degrees and adding an even/odd phase range thereto, the even/odd phase range being defined such that an even-numbered Fourier Transform bin is −270 degree at the left edge, 0 degrees in the middle, and +270 degrees on the right edge and such that an odd-numbered Fourier transform bin is +270 degrees at the left edge, −180/+180 degrees in the middle, and −270 degrees on the right edge, with the amount of correction being linear between the boundary edges.

16. The method as recited in claim 1, wherein the step of differentially demodulating the data signal comprises subtracting a phase of a current data signal from a phase of a previous data signal and providing a linearly-scaled number between −1 and +1, where −1 is a phase of −90 degrees, 0 is a phase of 0 degrees, 180 degrees, or −180° and +1 is a phase of +90 degrees.

17. The method as recited in claim 1, wherein the step of multiplying the demodulated data signal with a correlation sequence comprises multiplying the demodulated data signal with a 13-bit Willard sequence of 1111100101000 which is modified by replacing the 0's with −1's to provide a number between −13 and +13, where +13 is the maximum correlation value, the circuit also compares the number to a threshold and when the number exceeds the threshold, then a correlation detection is found, the correlation detection defining a start of the message.

18. The method as recited in claim 1, wherein the step of multiplying the demodulated data signal with a correlation sequence comprises multiplying the demodulated data signal with a 13-bit Willard sequence of 1111100101000 which is modified by replacing the 0's with −1's to provide a number between −13 and +13, where +13 is the maximum correlation value, and also comparing the number to a threshold equal to +10 and when the number exceeds the threshold, then a correlation detection is found, the correlation detection defining a start of the message.

19. The method as recited in claim 1, wherein the step of multiplying the demodulated data signal with a correlation sequence comprises multiplying the demodulated data signal with a 13-bit Willard sequence of 1111100101000 which is modified by replacing the 0's with −1's to provide a number between −13 and +13, where +13 is the maximum correlation value, the circuit also compares the number to a threshold equal to +10, and when the number exceeds the threshold, then a correlation detection is found, the correlation detection defining a start of the message, the message being formatted into a block size of 127 bits, of which 16 bits are synchronization bits and 111 bits are data bits, the 16 synchronization bits comprising 13 Willard bits, a start bit, and 2 spare bits.

20. A phase decoder for decoding a data signal, the phase decoder comprising:
   a) a window circuit for reducing sidelobes in a frequency spectrum of the data signal so as to mitigate interference with other signals;
   b) a Fourier Transform circuit for transforming the windowed data signal into real and imaginary frequency components thereof;
   c) a rectangular-to-polar conversion circuit for converting the real and imaginary frequency components of the data signal into phase and magnitude information with respect thereto;
   d) a noise floor circuit for summing a plurality of frequencies which substantially comprise noise to provide a magnitude of a noise floor;
   e) a signal-to-noise ratio circuit for comparing the magnitude of the data signal to the magnitude of the noise floor so as to provide a signal-to-noise ratio;
   f) a threshold detector circuit for comparing the signal-to-noise ratio to a threshold value and for facilitating further processing of the signal when the signal-to-noise ratio exceeds the threshold value;
   g) a find peak circuit for identifying a maximum magnitude of the data signal;
   h) a phase correction circuit for calculating a phase correction and adding the phase correction to the data signal;
   i) a differential phase decoder for differentially demodulating the data signal;
   j) a correlator for multiplying the demodulated data signal with a correlation sequence; and
   k) a binary convertor for hard limiting the output of the differential phase decoder and for converting the output of the differential phase decoder to a binary number.

21. The phase decoder as recited in claim 20, wherein the window circuit comprises a circuit for multiplying the data signal by a window function.

22. The phase decoder as recited in claim 20, wherein the window circuit comprises a circuit selected from the group consisting of:
   a) a 4 sample Blackman-Harris window circuit;
   b) a Hamming window circuit; and
   c) a Blackman window circuit.

23. The phase decoder as recited in claim 20, wherein the Fourier Transform circuit comprises a Fast Fourier Transform (FFT) circuit.

24. The phase decoder as recited in claim 20, wherein the Fourier Transform circuit comprises a circuit for transforming the windowed data signal into 16,384 real frequency components and 16,384 imaginary frequency components.

25. The phase decoder as recited in claim 20, wherein the rectangular-to-polar conversion circuit comprises a circuit for converting only those frequencies which are required for decoding of the data signal.

26. The phase decoder as recited in claim 20, wherein the noise floor circuit comprises a circuit for summing approximately 500 frequencies above a frequency of the data signal and approximately 500 frequencies below the frequency of the data signal.

27. The phase decoder as recited in claim 20, wherein the threshold detector circuit comprises a circuit having a threshold value of between approximately 6 dB and approximately 50 dB.

28. The phase decoder as recited in claim 20, wherein the threshold detector circuit comprises a circuit having a threshold value of approximately 6 dB.

29. The phase decoder as recited in claim 20, wherein the find peak circuit comprises a circuit for reading frequency components from the Fourier Transform circuit and calculating a slope of the magnitudes and defining a center frequency of the data signal.

30. The phase decoder as recited in claim 20, wherein the find peak circuit comprises a circuit for reading frequency components from left to right to calculate a slope of the magnitudes, a center frequency of the data signal being defined as the frequency immediately to the left of the first frequency which results in a calculation of a negative slope.

31. The phase decoder as recited in claim 20, further comprising a sort peak circuit for receiving peaks from the find peak circuit and for sending only those peaks which can be processed real time by the phase correction circuit thereto.

32. The phase decoder as recited in claim 20, wherein the phase correction circuit comprises a circuit for modifying a phase of a data signal when a peak of the data signal is not in the center of a Fourier Transform bin.

33. The phase decoder as recited in claim 20, wherein the phase correction circuit comprises a circuit for modifying a phase of a data signal when a peak of the data signal is not in the center of a Fourier Transform bin by determining a peak magnitude of the data signal and a next highest magnitude of the signal and forming a ratio thereof, then multiplying the ratio by 90 degrees and adding an even/odd phase range thereto.

34. The phase decoder as recited in claim 20, wherein the phase correction circuit comprises a circuit for modifying a phase of a data signal when a peak of the data signal is not in the center of a Fourier Transform bin by determining a peak magnitude of the data signal and a next highest magnitude of the signal and forming a ratio thereof, then multiplying the ratio by 90 degrees and adding an even/odd phase range thereto, the even/odd phase range being defined such that an even numbered Fourier Transform bin is −270 degrees at the left edge, 0 degrees in the middle, and +270 degrees on the right edge and such that an odd numbered Fourier Transform bin is +270 degrees at the left edge, −180/+180 degrees in the middle, and −270 degrees on the right edge, with the amount of correction being linear between the boundary edges.

35. The phase decoder as recited in claim 20, wherein the differential phase decoder comprises a circuit for subtracting a phase of a current data signal from a phase of a previous data signal and providing a linearly scaled number between −1 and +1, where −1 is a phase of −90 degrees, 0 is a phase of 0 degrees, 180 degrees, or −180 degrees, and +1 is a phase of +90 degrees.

36. The phase decoder as recited in claim 20, wherein the correlator comprises a circuit for multiplying the demodulated data signal with a 13-bit Willard sequence of 1111100101000 which is modified by replacing the 0's with −1's to provide a number between −13 and +13, where +13 is the maximum correlation value, the circuit also compares the number to a threshold and when the number exceeds the threshold, then a correlation detection is found, the correlation detection defining a start of the message.

37. The phase decoder as recited in claim 20, wherein the correlator comprises a circuit for multiplying the demodulated data signal with a 13-bit Willard sequence of 1111100101000 which is modified by replacing the 0's with −1's to provide a number between −13 and +13, where +13 is the maximum correlation value, the circuit also compares the number to a threshold equal to +10, and when the number exceeds the threshold, then a correlation detection is found, the correlation detection defining a start of the message.

38. The phase decoder as recited in claim 20, wherein the correlator comprises a circuit for multiplying the demodulated data signal with a 13 -bit Willard sequence of 1111100101000 which is modified by replacing the 0's with −1's to provide a number between −13 and +13, where +13 is the maximum correlation value, the circuit also compares the number to a threshold equal to +10, and when the number exceeds the threshold, then a correlation detection is found, the correlation detection defining a start of the message, the message being formatted into a block size of 127 bits, of which 16 bits are synchronization bits and 111 bits are data bits, the 16 synchronization bits comprising 13 Willard bits, a start bit, and 2 spare bits.

* * * * *